United States Patent
Gu et al.

(10) Patent No.: US 11,898,303 B2
(45) Date of Patent: Feb. 13, 2024

(54) SURFACE-MODIFIED ARAMID FIBER AND PREPARATION METHOD THEREFOR

(71) Applicant: SOOCHOW UNIVERSITY, Suzhou (CN)

(72) Inventors: Aijuan Gu, Suzhou (CN); Hua Cai, Suzhou (CN); Guozheng Liang, Suzhou (CN); Li Yuan, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 551 days.

(21) Appl. No.: 17/052,903

(22) PCT Filed: May 10, 2018

(86) PCT No.: PCT/CN2018/086408
§ 371 (c)(1),
(2) Date: Nov. 4, 2020

(87) PCT Pub. No.: WO2019/210529
PCT Pub. Date: Nov. 7, 2019

(65) Prior Publication Data
US 2021/0222358 A1    Jul. 22, 2021

(30) Foreign Application Priority Data
May 4, 2018   (CN) .......................... 201810422356.2

(51) Int. Cl.
| | | |
|---|---|---|
| *D06M 11/38* | (2006.01) | |
| *D06M 11/36* | (2006.01) | |
| *D06M 11/80* | (2006.01) | |
| *D06M 13/513* | (2006.01) | |
| *D06M 15/61* | (2006.01) | |
| *D06M 101/36* | (2006.01) | |

(52) U.S. Cl.
CPC ............ *D06M 11/38* (2013.01); *D06M 11/36* (2013.01); *D06M 11/80* (2013.01); *D06M 13/513* (2013.01); *D06M 15/61* (2013.01); *D06M 2101/36* (2013.01)

(58) Field of Classification Search
CPC .................................................... D06M 11/38
See application file for complete search history.

(56) References Cited

FOREIGN PATENT DOCUMENTS

| CN | 103572583 A | | 2/2014 | |
|---|---|---|---|---|
| CN | 104404772 A | * | 3/2015 | |
| CN | 104404772 A | | 3/2015 | |
| CN | 105887469 A | | 8/2016 | |
| CN | 107216689 A | * | 9/2017 | |
| CN | 107216689 A | | 9/2017 | |
| CN | 107629461 A | | 1/2018 | |
| GB | 2039826 A | * | 8/1980 | ........... A61C 9/0033 |
| JP | 2000086210 A | | 3/2000 | |
| JP | 2001139925 A | * | 5/2001 | |
| JP | 2001139925 A | | 5/2001 | |
| WO | WO-2010038503 A1 | * | 4/2010 | ............. B82Y 30/00 |

OTHER PUBLICATIONS

Zhang, Facile Preparation of Hyperbranched Polysiloxane-Grafted Aramid Fibers with Simultaneously Improved UV Resistance, Surface Activity, and Thermal and Mechanical Properties, Ind. Eng. Chem. Res., 2014, 53, 7, p. 2684-2696 (Year: 2014).*
Gu A, CN-104404772-A, Mar. 2015, Translated by Google Translate on May 6, 2023 (Year: 2015).*
Adachi K, JP-2001139925-A, May 2001, Translated by Google Translate on May 6, 2023 (Year: 2001).*
Qi S, CN-107216689-A, Sep. 2017, Translated by Google Translate on May 6, 2023 (Year: 2017).*
Ogata S, WO-2010038503-A1, Apr. 2010, Translated by Google Translate on May 6, 2023 (Year: 2010).*

* cited by examiner

*Primary Examiner* — Tabatha L Penny
(74) *Attorney, Agent, or Firm* — SZDC Law PC

(57) ABSTRACT

The present invention relates to a surface-modified aramid fiber and a method for preparing the same. The method includes the following steps: modifying an aramid fiber having amino groups and carboxyl groups on the surface with siloxane γ-glycidoxypropyltrimethoxysilane to obtain a silicon methoxylated aramid fiber; reacting same with a cerium oxide coated with polydopamine modified chaotic boron nitride to obtain a surface-modified aramid fiber. The cerium oxide coated with polydopamine modified chaotic boron nitride has high ultraviolet absorption, and has extremely low catalytic activity, avoiding the damage to a fiber structure by photocatalysis during radiation, being an effective, safe and highly-efficient ultraviolet absorber. The surface-modified aramid fiber provided in the present invention has an ultraviolet-resistant function, high surface activity, good thermal performance, and better mechanical performance, providing excellent overall performance, and having higher utilization value. The method is simple and controllable, being suitable for large scale production.

4 Claims, 6 Drawing Sheets

SURFACE-MODIFIED ARAMID FIBER AND PREPARATION METHOD THEREFOR

This application is the National Stage Application of PCT/CN2018/086408, filed May 10, 2018, which claims priority to Chinese Patent Application No. 201810422356.2, filed on May 4, 2018, which is incorporated by reference for all purposes as if fully set forth herein.

TECHNICAL FIELD

The invention relates to a surface modification technology of aramid fiber, in particular to a surface modified aramid fiber and a preparation method thereof.

BACKGROUND TECHNIQUE

Aramid fiber is a typical representative of high-performance organic fiber. Its excellent comprehensive properties such as light weight, ultra high strength, high modulus and high heat resistance make it in aerospace, safety protection, electronic information, sporting goods, tire skeleton, etc. The field plays an important role. However, aramid fibers have disadvantages such as low surface activity and poor ultraviolet resistance.

In recent years, in order to improve the surface activity and ultraviolet resistance of aramid fibers, an ultraviolet shielding agent has been introduced on the surface of the aramid fiber. UV shielding agents are classified into organic UV shielding agents and inorganic UV shielding agents. However, organic ultraviolet shielding agents have poor heat resistance and oxidation resistance. These problems are well controlled in inorganic UV screening agents, but there is a problem of high catalytic activity, which brings the risk of photocatalytic degradation of organic fibers; in addition, the binding force of inorganic materials and organic fibers is limited, during use. There will be problems with shedding, which will affect the reliability of service.

Therefore, the development of a new type of aramid fiber with both surface activity and UV resistance and its preparation method have great application value.

Technical Problem

In order to overcome the problems existing in the prior art, the present invention aims to maintain the mechanical properties and thermal properties of the fiber without reducing the chemical bonding force on the basis of developing an inorganic ultraviolet modifier having low catalytic activity. A new type of coating is formed on the surface of the aramid fiber to impart high surface activity and UV resistance to the modified aramid fiber. At the same time, the corresponding preparation method is provided.

Technical Solution

In order to achieve the above object, the technical solution adopted by the present invention is:

A method for preparing a surface-modified aramid fiber includes the following steps:
(1) immersing a surface-cleaned aramid fiber in an alkali metal hydroxide alcohol solution having a mass concentration of 5.0 to 15.0%, and shaking and reacting at 50 to 80° C. for 4 to 8 hours to obtain an aramid fiber grafted with amino and carboxyl groups on a surface thereof;
(2) immersing the aramid fiber grafted with amino and carboxyl groups in an organic solvent containing γ-glycidoxypropyltrimethoxysilane under an inert gas atmosphere, and reacting at 50 to 100° C. for 10 to 18 hours to obtain a silicon methoxylated aramid fiber;
(3) dissolving a cerium salt and an inorganic base in water, stirring for 20 to 45 minutes, adding hydrogen peroxide to obtain a suspension, adjusting a pH of the suspension to 10 to 14, reacting at 20 to 50° C. for 10 to 20 hours, washing and filtering, drying, calcining at 500 to 800° C. for 1 to 3 hours to obtain a nano-cerium oxide; dispersing the nano-cerium oxide, a boron source and a nitrogen-containing compound in a mixed solution of ethanol and water, ultrasonically stirring for 0.5 to 1.5 hour, steaming and drying, calcining at 650° C. to 1050° C. for 3 to 11 hours under a nitrogen source gas to obtain cerium oxide particles coated with chaotic boron nitride;
(4) adding the cerium oxide particles coated with chaotic boron nitride and dopamine hydrochloride to a buffer having a pH of 8.3 to 8.8, and stirring at 20 to 40° C. for 5 to 8 hours; filtering, washing, and drying to obtain a cerium oxide coated with polydopamine modified chaotic boron nitride;
(5) immersing the silicon methoxylated aramid fiber in an aqueous solution of the cerium oxide coated with polydopamine modified chaotic boron nitride, and shaking at 50 to 80° C. for 4 to 7 hours; washing and drying to obtain the surface modified aramid fiber.

The invention discloses a preparation method of silicon methoxylated aramid fiber that includes the following steps:
(1) immersing an aramid fiber sequentially in acetone, petroleum ether and deionized water, each for 2-4 hours, and then washing and drying to obtain a surface-cleaned aramid fiber;
(2) immersing the surface-cleaned aramid fiber in an alcohol solution of an alkali metal hydroxide having a mass concentration of 5.0 to 15.0%, and shaking and reacting at 50 to 80° C. for 4 to 8 hours to obtain an aramid fiber grafted with amino and carboxyl groups on a surface thereof;
(3) immersing the aramid fiber grafted with amino and carboxyl groups in an organic solvent containing γ-glycidoxypropyltrimethoxysilane under an inert gas atmosphere, and reacting at 50 to 100° C. for 10 to 18 hours to obtain the silicon methoxylated aramid fiber.

The invention discloses a preparation method of polydopamine modified chaotic boron nitride coated cerium oxide, comprising the following steps:
(1) dissolving a cerium salt and an inorganic base in water, stirring for 20 to 45 minutes, adding hydrogen peroxide to obtain a suspension, adjusting a pH of the suspension to 10 to 14, reacting at 20 to 50° C. for 10 to 20 hours, washing, filtering, drying, and calcining at 500 to 800° C. for 1 to 3 hours to obtain a nano cerium oxide;
(2) dispersing the nano cerium oxide, a boron source and a nitrogen-containing compound in a mixed solution of ethanol and water, ultrasonically stirring for 0.5 to 1.5 hours, spinning and drying, nitriding under a nitrogen source gas at 650° C., calcining at 1050° C. for 3 to 11 hours to obtain cerium oxide particles coated with chaotic boron nitride;
(3) adding the cerium oxide particles coated with chaotic boron nitride and dopamine hydrochloride to a buffer having a pH of 8.3 to 8.8, and stirring at 20 to 40° C.

for 5 to 8 hours, filtering, washing, and drying to obtain the cerium oxide coated with polydopamine modified chaotic boron nitride.

In the present invention, the aramid fiber is a para-aramid fiber or a meta-aramid fiber; the alkali metal hydroxide is sodium hydroxide, potassium hydroxide or a combination thereof; the inorganic base is sodium hydroxide, potassium hydroxide or a combination thereof; the inert gas is nitrogen gas, argon gas, or a combination thereof; the organic solvent is ethanol, n-butanol, or a combination thereof; the cesium salt is cerium nitrate, cerium chloride, or a combination thereof; the boron source is boric acid or metaboric acid; the nitrogen-containing compound is urea, melamine, or ammonium bromide; the nitrogen source gas is nitrogen or ammonia; and the buffer is Tris-HCl or disodium hydrogen phosphate-sodium dihydrogen phosphate buffer.

In the present invention, an aramid fiber is sequentially immersed in acetone, petroleum ether and deionized water, each for 2 to 4 hours, and then washed and dried to obtain the surface-cleaned aramid fiber.

In the present invention, a mass ratio of the aramid fiber grafted with amino and carboxyl groups, the γ-glycidyloxypropyltrimethoxysilane, and the organic solvent is 1:(100-200):(150-350); a mass ratio of the nano-cerium oxide, the boron source, the nitrogen-containing compound is 100:(30-50):(60-120); a mass ratio of the silicon methoxylated aramid fiber and the polydopamine-modified chaotic boron nitride coated cerium oxide is 1:(2-9); and a mass ratio of the cerium salt and the inorganic base is 100:(20-50).

The preparation method of the present invention can be exemplified as follows, by mass, (1) An aramid fiber is immersed sequentially in acetone, petroleum ether and deionized water, each for 2 to 4 hours, washed and dried to obtain a surface-cleaned aramid fiber;

(2) 1 Part of the surface-cleaned aramid fiber is immersed in an alcohol solution of an alkali metal hydroxide having a mass concentration of 5.0 to 15.0% by weight, a reaction is carried out for 4 to 8 hours at a temperature of 50° C. to 80° C., and the aramid fiber is washed and dried to obtain an aramid fiber grafted with amino and carboxyl groups on the surface;

(3) 1 Part of the aramid fiber grafted with amino and carboxyl groups on the surface obtained in the step (2) is immersed in 150 to 350 parts of an organic solvent containing 100 to 200 parts of γ-glycidoxypropyltrimethoxysilane under an inert gas atmosphere, reacting at a temperature of 50 to 100° C. for 10 to 18 hours to obtain a silicon methoxylated aramid fiber;

(4) 100 Parts of cerium salt and 20-50 parts of inorganic alkali are dissolved in water, stirred for 20 to 45 minutes to obtain suspension B; hydrogen peroxide is added, and the pH of suspension B is adjusted to 10 to 14 with an inorganic base; the reaction is carried out at a temperature of 20° C. to 50° C. for 10-20 hours; after washing with water, filtering and drying, the mixture is calcined in a muffle furnace at a temperature of 500-800° C. for 1 to 3 hours to obtain a nano-cerium oxide;

(5) 100 Parts of the nano cerium oxide obtained in the step (4), 30 to 50 parts of boron source and 60 to 120 parts of the nitrogen-containing compound are dispersed in a mixed solution composed of ethanol and water (the volume ratio of ethanol to water is 1:1-1:2), ultrasonic, stirred 0.5-1.5 hours; rotary evaporating and drying, calcining under a nitrogen source gas at a temperature of 650° C.-1050° C. for 3-11 hours; after the reaction is finished, washing, drying to obtain cerium oxide coated with chaotic boron nitride, the chaotic layer of boron nitride is a shell, and cerium oxide is a core;

(6) Using a buffer reagent or a buffer solution, a buffer solution having a concentration of 10 mM is added to a pH of 8.3 to 8.8 with an inorganic base to obtain a buffer solution C; with a mass ratio of cerium oxide to dopamine hydrochloride coated with chaotic boron nitride is 5:2, adding chaotic boron nitride coated cerium oxide particles and dopamine hydrochloride to the C solution, stirring at a temperature of 20° C.-40° C. for 5-8 hours; after the reaction is finished, filtering, washing, drying, to obtain polydopamine modified chaotic boron nitride coated cerium oxide, polydopamine is the outermost shell, chaotic boron nitride is the inner shell, and nano cerium oxide is the core;

(7) 1 Part of the silicon methoxylated aramid fiber obtained in the step (3) is immersed in an aqueous solution containing 2 to 9 parts of polydopamine modified chaotic boron nitride coated cerium oxide at a temperature of 50° C. to 80° C.; the mixture is shaken for 4 to 7 hours; after the reaction is completed, the fiber is taken out, washed, and dried to obtain a surface-modified aramid fiber.

The invention discloses a surface-modified aramid fiber prepared according to the preparation method of the surface-modified aramid fiber described above; and the silicon methoxylated aramid fiber prepared by the above preparation method or the ceria oxide coated with polydopamine modified chaotic boron nitride.

The invention discloses the application of the above silicon methoxylated aramid fiber or polydopamine modified chaotic boron nitride coated cerium oxide in preparing the surface modified aramid fiber and the surface modified aramid fiber, and the use of fibers in the preparation of UV resistant materials.

Beneficial Effect

Compared with the prior art, the beneficial effects obtained by the present invention are:

1. The invention utilizes polydopamine modified chaotic boron nitride coated cerium oxide to chemically react with the silicon methoxylated aramid fiber, so that the inorganic nanoparticles and the aramid fiber surface are chemically bonded, thereby overcoming the prior art. The problem of limited binding exists to ensure the service reliability of the modified aramid fiber.

2. The novel inorganic nano modifier provided by the invention is a polydopamine modified chaotic boron nitride coated cerium oxide, which has high ultraviolet absorption, high heat resistance and low photocatalytic activity. These excellent properties are attributed to the isolation of the oxygen medium by polydopamine and chaotic boron nitride, which inhibits the generation of photoelectrons and holes.

3. The invention forms a coating composed of polydopamine-modified chaotic boron nitride coated cerium oxide on the aramid fiber, improves the roughness of the fiber, and introduces a large amount of hydroxyl groups and amino groups, thereby improving the aramid fiber. Surface activity provides a material basis for the subsequent modification of aramid fibers and the preparation of resin-based composites.

4. The polydopamine modified chaotic boron nitride coated cerium oxide prepared by the invention is coated on the surface of the aramid fiber, can absorb and shield external stress, and the focusing energy is released, thereby improving the tensile strength and the fracture work of the fiber. The polydopamine-modified chaotic boron nitride coated cerium oxide coated on the surface of the fiber has good heat resistance and can interact with the fiber to ensure the excellent thermal properties of the modified fiber.

5. The preparation method of the surface modified aramid fiber provided by the invention has the advantages of simple and controllable process, low cost and high safety, and the reagents used are all low-toxic or non-toxic substances.

DRAWINGS

EMBODIMENTS OF THE INVENTION

Figure 1:
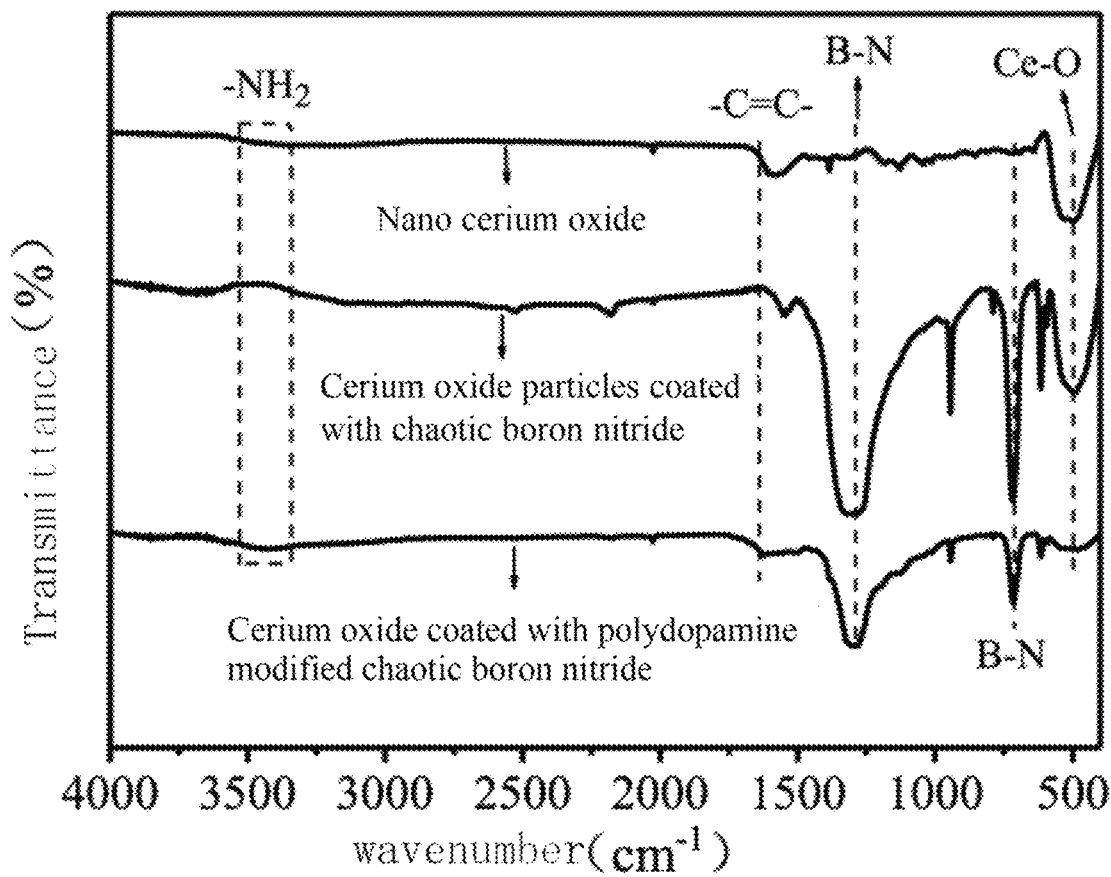
FIG. 1 is an infrared (FTIR) spectrum of a cerium oxide coated with polydopamine-modified chaotic boron nitride of Example 1 of the present invention.

The technical solutions of the present invention are further described below in conjunction with the accompanying drawings and embodiments.

Example 1

1. Preparation of Surface Modified Aramid Fiber
(1) 1 g of aramid fiber (Kevlar-49, diameter 12 μm, density 1.45 g/m$^3$, manufactured by DuPont, USA) was sequentially immersed in 70° C. acetone, 75° C. petroleum ether and 115° C. deionized water, each for 3 h; the fiber was taken out and dried in a vacuum oven at 80° C. to obtain a surface-cleaned aramid fiber, which was recorded as KF;
(2) 10.5 g of sodium hydroxide was dissolved in 120 mL of ethanol to prepare an ethanol solution A of sodium hydroxide; the surface-cleaned aramid fiber KF obtained in the step (1) was immersed in the solution A; the reaction solution was shaken at 65° C. for 5 hours; after the reaction was completed, the aramid fiber was washed and dried to obtain an aramid fiber grafted with amino group and carboxyl groups on the surface;
(3) 0.25 g of aramid fiber grafted with amino and carboxyl groups on the surface and 30 mL of γ-glycidoxypropyltrimethoxysilane were added to 70 mL of ethanol, and reacted at 70° C. for 12 hours under a nitrogen atmosphere; after the reaction was complete, the fiber was taken out to obtain an aramid fiber having a silicon methoxy group on the surface;
(4) 12.32 g of cerium chloride and 6 g of sodium hydroxide were dissolved in an aqueous solution, stirred for 35 minutes to obtain a suspension B; hydrogen peroxide was added, the pH of the suspension B was adjusted to 12 with sodium hydroxide, and the reaction was conducted at 40° C. for 12 hours, filtered, washed, dried, and calcined at 700° C. for 2 hours in a muffle furnace to obtain nano cerium oxide $CeO_2$;
(5) 0.3 g of nano cerium oxide, 0.12 g of boric acid and 0.21 g of urea were placed in a mixed solution of 40 mL of ethanol and 20 mL of water, and ultrasonically dispersed for 1 hour; the mixture was evaporated, dried, and calcined at 950° C. for 5 hours under a nitrogen atmosphere, washed and dried to obtain chaotic boron nitride coated cerium oxide tBN@$CeO_2$;
(6) A 10 mM Tris-HCl buffer solution was adjusted to pH of 8.5 with sodium hydroxide to obtain a buffer solution C; the mass ratio of the cerium oxide coated with chaotic boron nitride and dopamine was 5:2; the cerium oxide coated with chaotic boron nitride and dopamine were added to the buffer solution C, and stirred at room temperature for 6 hours; after the reaction was completed, the mixture was filtered, washed and dried to obtain a polydopamine-modified chaotic boron nitride-coated cerium oxide. PDA@tBN@$CeO_2$. Its infrared spectrum (FTIR) spectrum, transmission electron microscope (TEM) photograph, ultraviolet absorption (UV-Vis) spectrum, and photocatalytic constant diagram were show in FIGS. 1, 2, 3, 4, respectively;
(7) 0.2 g of silicon methoxylated aramid fiber and 1 g of polydopamine-modified chaotic boron nitride coated cerium oxide were dispersed in an aqueous solution and shaken at 60° C. for 6 hours; after the reaction was completed, the fiber was taken out, washed, and dried; the surface-modified aramid fiber was obtained as T-KF1; its infrared spectrum, scanning electron microscope (SEM) photograph, and tear and tensile properties were shown in FIGS. 5, 6 and 7, respectively; surface contact angle and free energy were shown in Table 1.

2. Ultraviolet Irradiation of Surface-Cleaned Fibers and Modified Aramid Fibers

The surface-cleaned aramid fiber obtained in the step (1) and the modified aramid fiber T-KF1 obtained in the step (6) were exposed to a QUV/spray type ultraviolet accelerated aging tester (Q-Lab, USA) for 168 hours of UV Irradiation (irradiation illuminance of 1.55 W/m$^2$, test temperature of 60° C.), and the surface-cleaned aramid fiber and modified aramid fiber irradiated by 168 h were obtained, recorded as UV-KF and UV-T-KF1, respectively. The tear and tensile properties were shown in FIG. 8.

Referring to FIG. 1, it shows infrared (FTIR) spectrum of cerium oxide coated with polydopamine-modified chaotic boron nitride of Example 1. The three-curve curves show the stretching vibration peak of Ce—O (510 cm$^{-1}$), the stretching vibration peak of the cerium oxide coated with chaotic boron nitride B—N (1310 cm$^{-1}$), and bending vibration peak (720 cm$^{-1}$); the spectrum of the cerium oxide coated with polydopamine modified chaotic boron nitride exhibits a stretching vibration peak of —C=C— (conjugated sp$^2$) (1633 cm$^{-1}$) and a bending vibration peak of —$NH_2$ (3400 cm$^{-1}$), indicating that the cerium oxide coated with polydopamine modified chaotic boron nitride had been successfully prepared.

Figure 2:
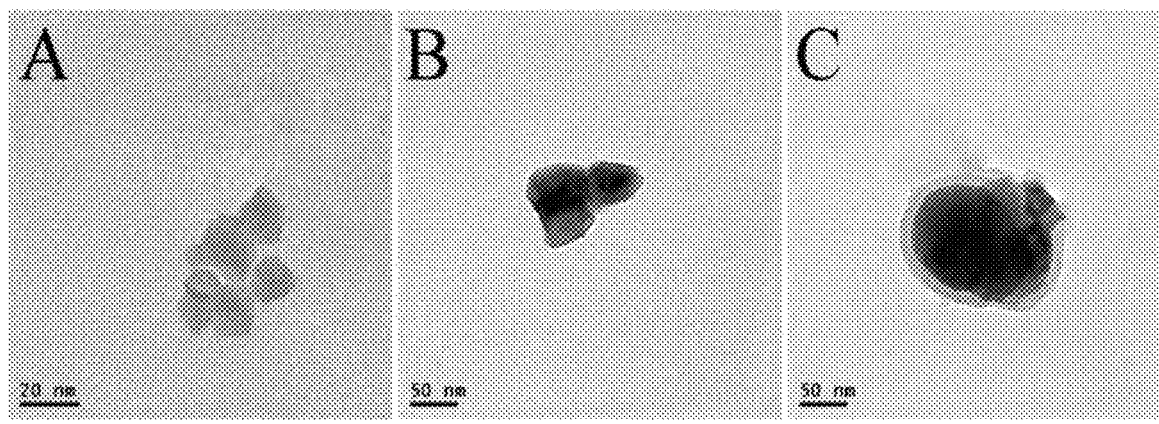
FIG. 2 is a transmission electron microscope (TEM) photograph of the cerium oxide coated with polydopamine-modified chaotic boron nitride of Example 1.

Referring to FIG. 2, it is a transmission electron microscope (TEM) photograph of the cerium oxide coated with polydopamine-modified chaotic boron nitride of Example 1. It can be seen that the particle diameters of the three kinds of nanoparticles were all less than 100 nm; the particle size of the cerium oxide coated with chaotic boron nitride was larger than that of nano cerium oxide. The surface of the cerium oxide coated with polydopamine-modified chaotic boron nitride had a distinct coating layer, and the coating layer was polydopamine, which provides a reactive group of a hydroxyl group and an amino group.

Figure 3:
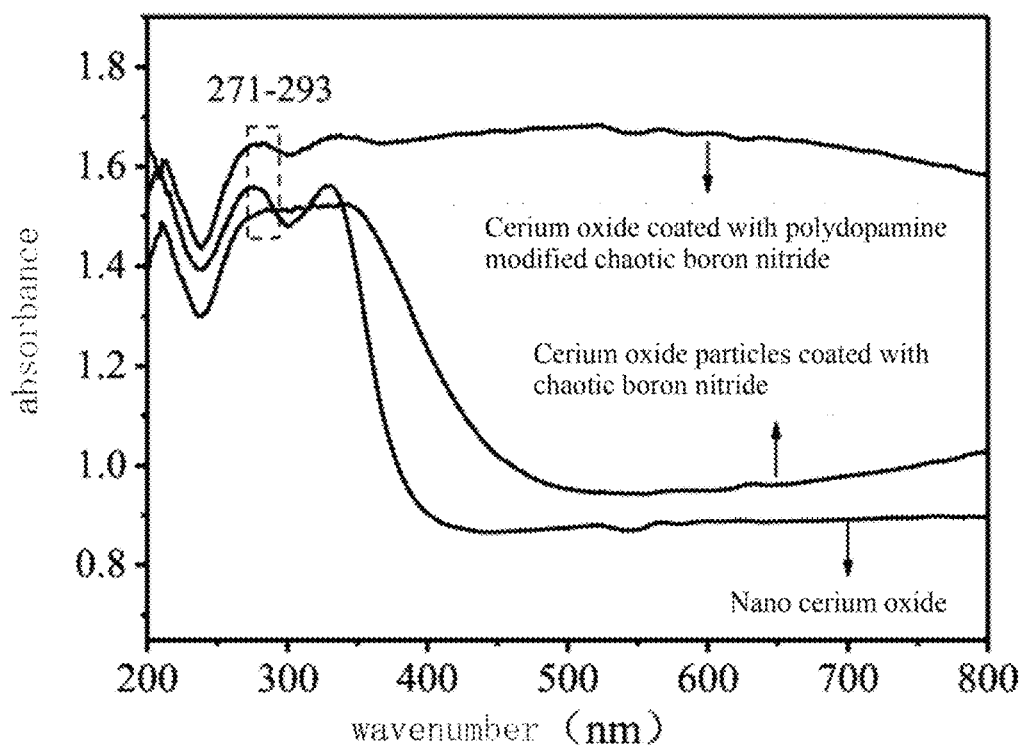
FIG. 3 is a UV-Vis spectrum of the cerium oxide coated with polydopamine-modified chaotic boron nitride of Example 1.

Referring to FIG. 3, it is the ultraviolet absorption (UV-Vis) spectrum of the coated cerium oxide coated with polydopamine-modified chaotic boron nitride of Example 1. It can be seen that the cerium oxide coated with chaotic boron nitride and the cerium oxide coated with polydopamine modified chaotic boron nitride had better UV absorption performance in the range of 200-330 nm than the nano cerium oxide modified by polydopamine. The absorbing layer of boron nitride coated cerium oxide had the best absorption performance. The strongest ultraviolet absorption wavelength of aramid fiber was about 286 nm, so the polydopamine modified chaotic boron nitride was grafted to the surface of aramid fiber to improve the UV resistance, and had the strongest pertinence.

Figure 4:
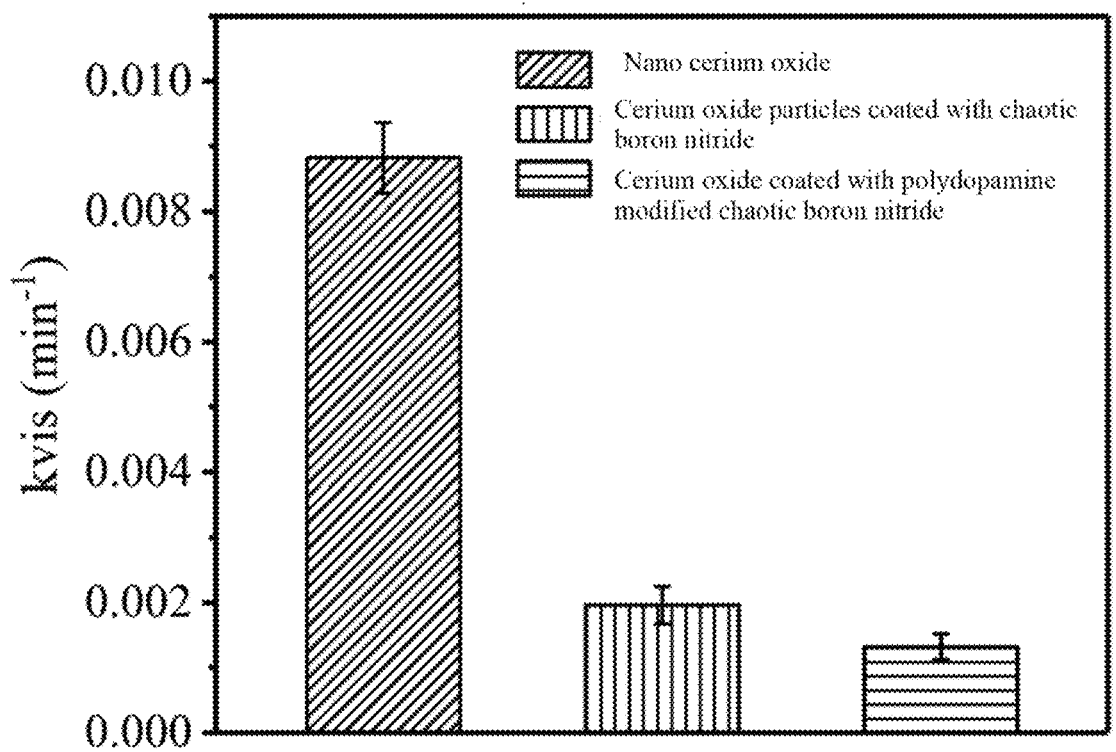
FIG. 4 is a photocatalytic constant of of the cerium oxide coated with polydopamine-modified chaotic boron nitride of Example 1 with respect to methyl orange.

Referring to FIG. 4, it is a photocatalytic constant diagram of polydopamine-modified chaotic boron nitride coated cerium oxide on methyl orange prepared in the first embodiment. It can be seen that the photocatalytic rate constants are in the order of k(CeO$_2$)>k(tBN@CeO$_2$)>k(PDA@tBN@CeO$_2$), i.e., the highest catalytic activity of CeO$_2$, followed by tBN@CeO$_2$, the lowest PDA@tBN@CeO$_2$, indicating that the presence of chaotic boron nitride shell can significantly reduce the photocatalytic activity of CeO$_2$; while continuing to coat PDA, the photocatalytic activity was further reduced.

Example 2

1. Preparation of Surface Modified Aramid Fiber 0.5 g of the silicon-containing methoxy aramid fiber prepared in the step (6) of Example 1 and 3.75 g of polydopamine-modified chaotic boron nitride coated cerium oxide were dispersed in an aqueous solution and shaken at 60° C. for 6 hours. After the reaction was completed, the fibers were taken out, washed, and dried. A surface-modified aramid fiber was obtained as T-KF2, and its infrared spectrum, scanning electron microscope (SEM) photograph, tear and tensile properties were shown in FIGS. 5, 6 and 7, respectively. Surface contact angle and free energy were shown in Table 1.

2. Ultraviolet Irradiation of Clean Fibers and Modified Fibers

Figure 8:
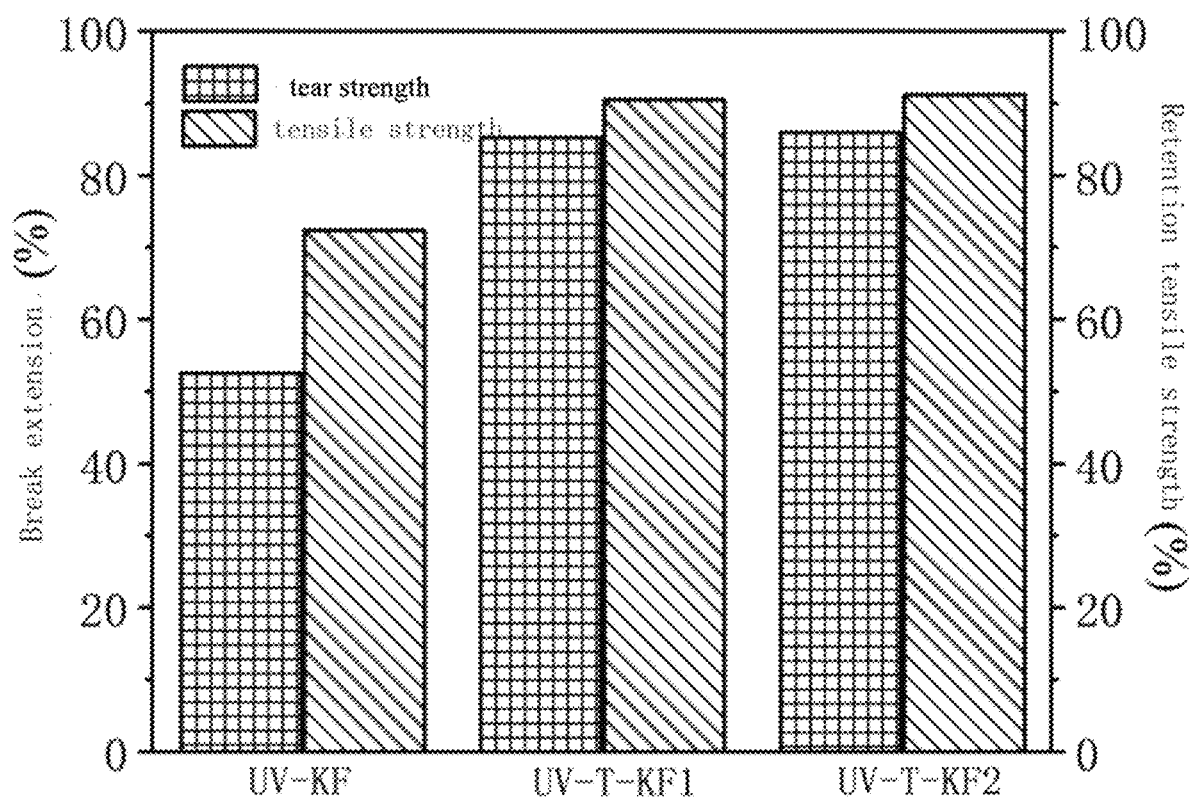
FIG. 8 is a graph showing the breaking and tensile strength of the surface-modified aramid fibers of Examples 1 and 2 and the surface-cleaned aramid fiber provided in Example 1 before and after 168 h of ultraviolet irradiation.

According to the same steps and conditions of Example 1, the aramid fiber T-KF2 obtained in Example 2 was subjected to UV irradiation for 168 hours to obtain 168 h ultraviolet irradiation fiber, which was recorded as UV-T-KF2, and tear and tensile properties were show in FIG. 8.

Figure 5:
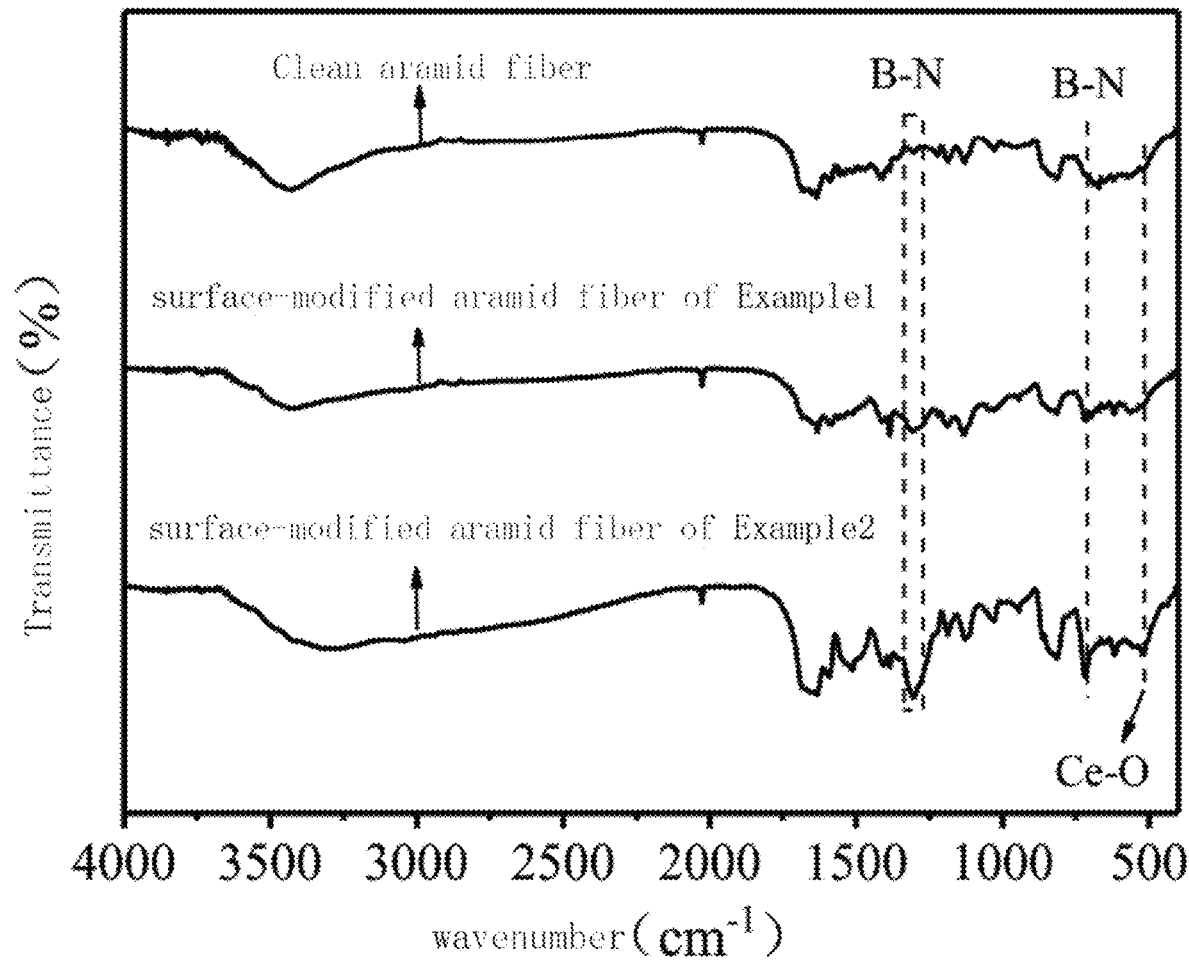
FIG. 5 is an infrared (FTIR) spectrum of the surface modified aramid fibers of Examples 1 and 2 and the surface-cleaned aramid fiber of Example 1.

Referring to FIG. 5, it shows the infrared spectra of the surface-cleaned aramid fiber of Example 1 and the surface-modified fibers of Example 1, Example 2, and Example 3. It can be seen that compared with the surface-cleaned aramid fiber KF of Example 1, the surface-modified fibers of Examples 1 and 2 exhibited two new peaks, a Ce—O stretching vibration peak (514 cm$^{-1}$) and —NH$_2$ bending vibration peak (3440 cm$^{-1}$); and the peak intensities of the two peaks at 715 cm$^{-1}$ and 1310 cm$^{-1}$ were significantly increased, which is the B—N bond bending vibration and stretching vibration together with the in-plane vibration of the KF scaffold caused by the effect. This indicates that the cerium oxide coated with polydopamine-modified chaotic boron nitride has been successfully grafted onto the surface of the aramid fiber.

Figure 6:
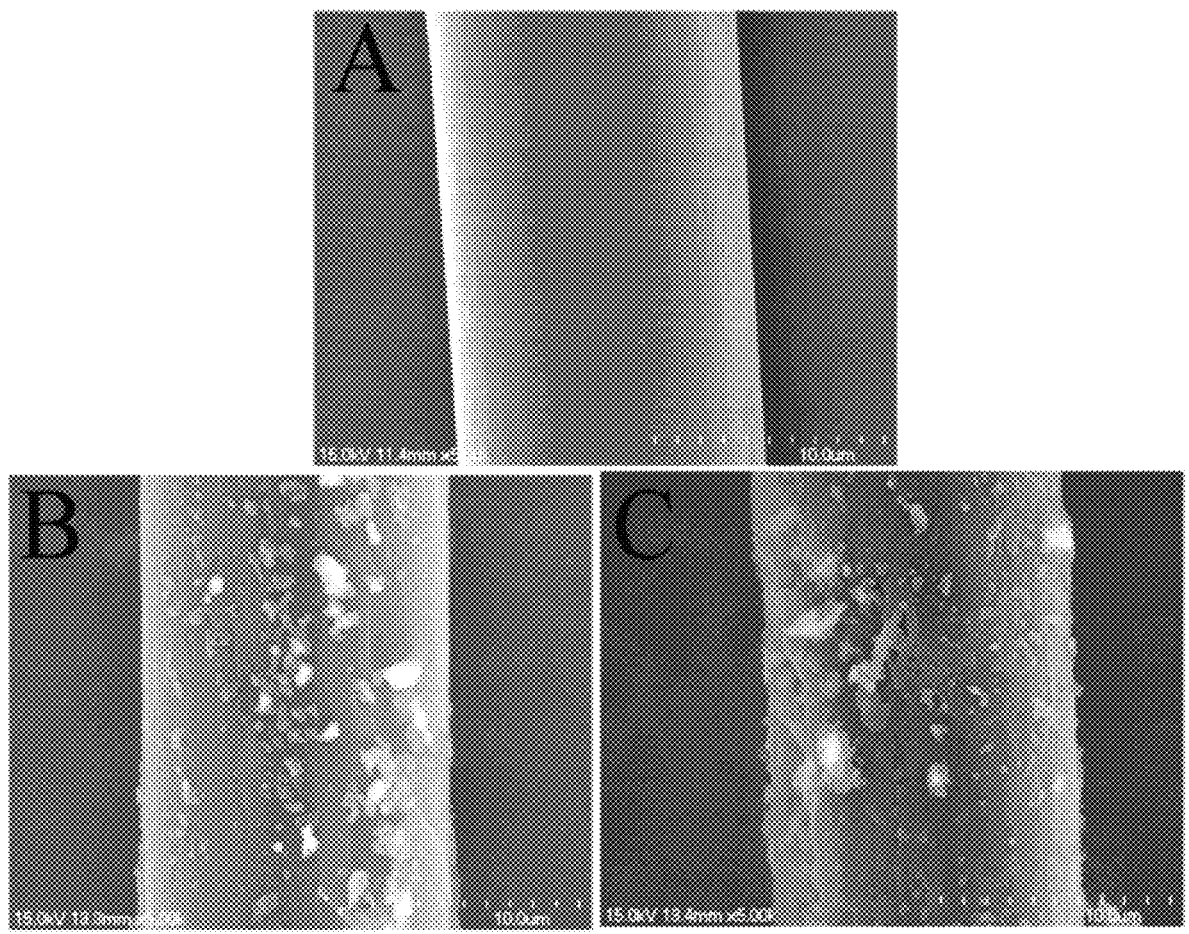
FIG. 6 is a scanning electron microscope (SEM) photograph of the surface-modified aramid fibers of Examples 1 and 2 and the surface-cleaned aramid fiber of Example 1.

Referring to FIG. 6, it is a scanning electron microscope (SEM) photograph of the surface modified fiber provided by the clean aramid fiber (FIG. 6A) prepared in Example 1 and Example 1 (FIG. 6B) and Example 2 (FIG. 6C). It can be seen that the surface of the surface-cleaned aramid fiber prepared in Example 1 is smooth (FIG. 6A); the surface roughness of the surface modified fiber provided in Example 2 (FIG. 6B) and Example 3 (FIG. 6C) significantly increased. More fine particles appeared on the surface and the coating became flaky and layered.

Figure 7:
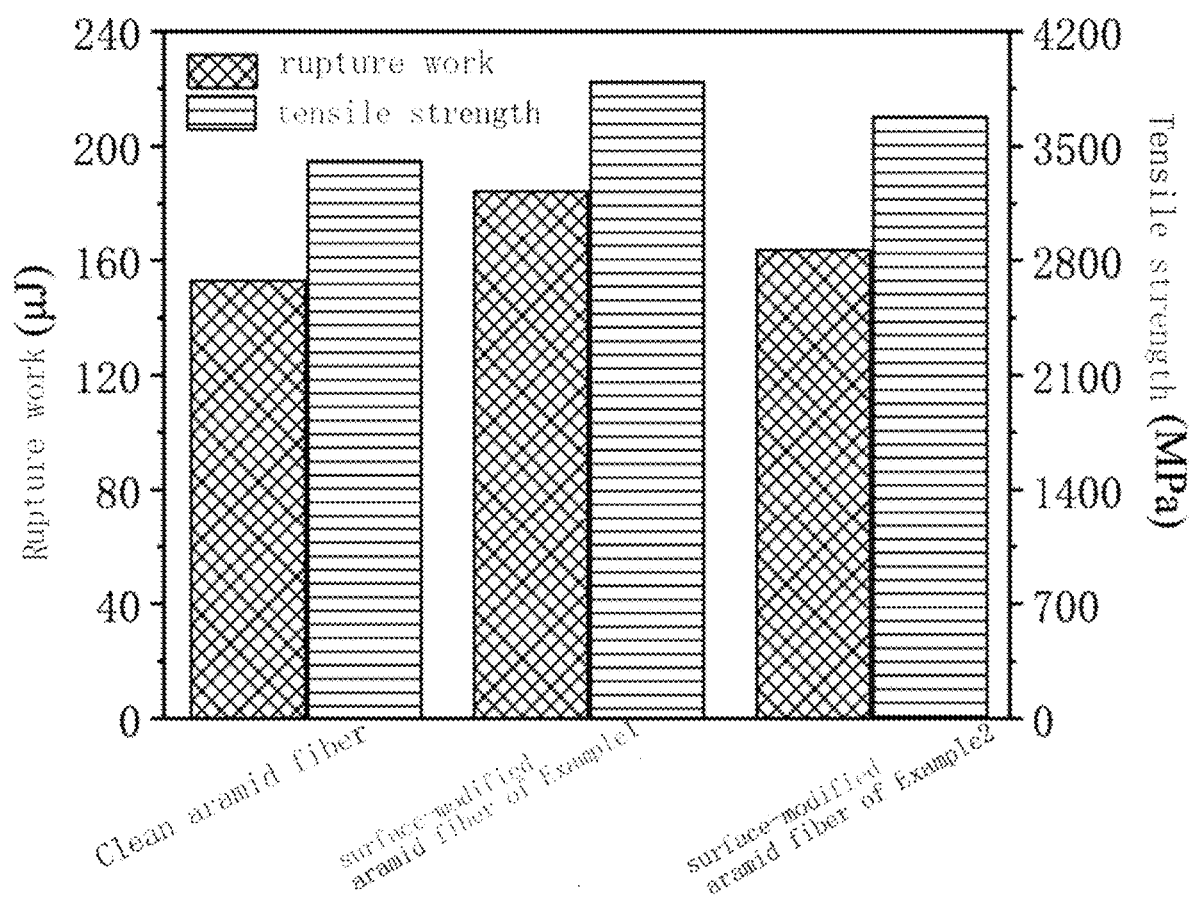
FIG. 7 is a graph showing the tear and tensile strength of the surface-modified aramid fibers of Examples 1 and 2 and the surface-cleaned aramid fiber of Example 1.

Referring to FIG. 7, it shows the tear and tensile strength of the surface-cleaned aramid fiber of Example 1 and the surface-modified fibers of Example 1 and Example 2. It can be seen that the tear strength of the surface modified fibers of Examples 1 and 2 were 1.21 and 1.07 times that of the surface-cleaned fibers, respectively; and the tensile strength of the surface modified fibers of Examples 1 and 2 were 1.14 and 1.08 times that of the clean fiber, respectively, indicating that the surface modification contributes to the fiber's tear and tensile strength.

Referring to FIG. 8, it is the retention rate of the tear and tensile strength of the clean aramid fiber prepared in Example 1 and the surface modified fiber provided in Example 1, Example 2 after 168 h of ultraviolet radiation. It can be seen that the tear strength of the clean fibers prepared in Example 1 decreased by 47.43% after 168 h of ultraviolet radiation, while the tear strength of the surface modified fibers provided in Examples 1 and 2 decreased by only 14.79% and 14.04%, respectively. In addition, after UV irradiation, the tensile strength of the clean fibers prepared in Example 1 decreased by 27.64%, and the tensile strength of the surface modified fibers provided in Examples 1 and 2 decreased by 9.5% and 8.8%, respectively. It is shown that the surface-modified fibers provided in Example 1 and Example 2 also significantly improve the ultraviolet resistance of the fibers and reduce the decrease in the tear and tensile strength. This is because the cerium oxide coated with polydopamine-modified chaotic boron nitride has ultraviolet shielding property, and can improve the ultraviolet resistance of the modified fiber and the mechanical property retention rate.

TABLE 1

Surface contact angle and free energy results

| Fibers | Surface contact angle (°) | | $\gamma_f^d$ (mN/m) | $\gamma_f^p$ (mN/m) | $\gamma_f$ (mN/m) |
| --- | --- | --- | --- | --- | --- |
| | Water | Ethanol | | | |
| KF | 93.12 ± 09 | 84.31 ± 1.3 | 4.67 | 11.61 | 16.28 |
| T-KF1 | 88.28 ± 2.0 | 78.97 ± 2.7 | 5.28 | 14.06 | 19.34 |
| T-KF2 | 85.6 ± 1.3 | 77.96 ± 1.6 | 4.25 | 17.11 | 21.36 |

In summary, the surface modified aramid fiber disclosed by the present invention has high mechanical properties, high ultraviolet resistance, and high surface activity.

Example 3

1. Preparation of Surface Modified Aramid Fiber
   (1) 1 g of aramid fiber (Kevlar-49, diameter 12 μm, density 1.45 g/m$^3$, manufactured by DuPont, USA) was sequentially immersed in acetone at 70° C., petroleum ether at 75° C. and deionized water at 115° C., each for 3 hours; the fibers were taken out and dried in a vacuum oven at 80° C. to obtain surface-cleaned aramid fiber, designated as KF.
   (2) 10.5 g of sodium hydroxide was dissolved in 120 mL of ethanol to prepare an ethanol solution A of sodium hydroxide; the surface-cleaned aramid fiber KF obtained in the step (1) was immersed in the above solution A, and the mixture was shaken and reacted at 65° C. for 5 hours. After the reaction was complete, the mixture was washed and dried to obtain an aramid fiber grafted with amino group and carboxyl groups on the surface.
   (3) 0.25 g of aramid fiber with amino and carboxyl groups on the surface and 30 mL of γ-glycidoxypropyltrimethoxysilane were added to 70 mL of ethanol, and the mixture was reacted at 70° C. for 12 hours under a nitrogen atmosphere; after the reaction was complete, the fiber was taken out to obtain an aramid fiber having a silicon methoxy group on its surface.
   (4) 12.32 g of cerium chloride and 6 g of sodium hydroxide were dissolved in an aqueous solution, and stirred for 35 minutes to obtain a suspension B; hydrogen peroxide was added, the pH of the suspension B was adjusted to 12 with sodium hydroxide, and the mixture was reacted at 40° C. for 12 hours, filtered, washed, dried, and calcined at 700° C. for 2 hours in a muffle furnace to obtain nano cerium oxide $CeO_2$.
   (5) 0.6 g of nano cerium oxide, 0.24 g of boric acid and 0.41 g of urea were placed in a mixed solution of 40 mL of ethanol and 20 mL of water, and ultrasonically dispersed for 1 hour; the mixture was evaporated, dried, and calcined at 950° C. for 5 hours under a nitrogen atmosphere; after completion was completed, the mixture was washed and dried to obtain a cerium oxide coated with chaotic boron nitride tBN@$CeO_2$.
   (6) Tris-HCl buffer solution of a concentration of 10 mM was provided, and the pH of the buffer solution was adjusted to 8.5 with sodium hydroxide to obtain a buffer solution C; the mass ratio of the cerium oxide coated with chaotic boron nitride to dopamine was 5:2; the boron nitride coated cerium oxide and dopamine hydrochloride were added to the buffer solution C, and stirred at room temperature for 6 hours; after the reaction was completed, the mixture was filtered, washed and dried to obtain a cerium oxide coated with polydopamine-modified chaotic boron nitride PDA@tBN@$CeO_2$.
   0.2 g of the silicon methoxy aramid fiber prepared in the step (3) of Example 3, and 1 g of cerium oxide coated with polydopamine-modified chaotic boron nitride were dispersed in an aqueous solution, and the mixture was reacted at 60° C. for 6 hours; after the reaction was completed, the fibers were taken out, washed, and dried to obtain a surface-modified aramid fiber was, designated as T-KF.

2. Ultraviolet Irradiation of Clean Fibers and Modified Fibers

According to the same steps and conditions of Example 1, the aramid fiber T-KF obtained in the step (6) of Example 3 was subjected to UV irradiation for 168 hours to obtain 168 h ultraviolet irradiation fiber, recorded as UV-T-KF, and stretched. The tensile strength dropped by 9.2%.

Example 4

1. Preparation of Surface Modified Aramid Fiber
   (1) 2.3 g of aramid fiber (Kevlar-49, diameter 12 μm, density 1.45 g/m$^3$, manufactured by DuPont, USA) was sequentially immersed in acetone at 60° C., petroleum ether at 75° C. and deionized water at 115° C., each for 3 hours; the fibers were taken out and dried in a vacuum oven at 80° C. to obtain a surface-cleaned aramid fiber, designated as KF.
   (2) 5.6 g of potassium hydroxide and 7 g of sodium hydroxide were dissolved in 120 mL of ethanol to prepare a solution A; and the clean aramid fiber KF obtained in the step (1) was immersed in the solution A; the mixture was reacted for 5 hours at a temperature of 65° C.; after the reaction was completed, the mixture was washed and dried to obtain an aramid fiber grafted with amino group and carboxyl groups on the surface.
   (3) 0.3 g of aramid fiber grafted with amino and carboxyl groups on the surface and 50 mL of γ-glycidoxypropyltrimethoxysilane were added to 90 mL of n-butanol, and reacted at 78° C. for 12 hours under a nitrogen atmosphere; after the reaction was completed, the fiber was taken out to obtain an aramid fiber having a silicon methoxy group on its surface.
   (4) 15 g of cerium chloride, 15 g of cerium nitrate, 9 g of sodium hydroxide were dissolved in an aqueous solution, stirred for 25 min to obtain a suspension B; hydrogen peroxide was added, the pH of the suspension B was adjusted to 13 with sodium hydroxide, and the mixture was reacted at 35° C. for 16 hours, filtered, washed, dried, and calcined in a muffle furnace at 760° C. for 1.5 hour to obtain nano-cerium oxide.
   (5) 5 g of nano cerium oxide, 2.5 g of metaboric acid and 6 g of ammonium bromide were placed in a mixed solution of 50 mL of ethanol and 30 mL of water, sonicated, stirred for 1 hour, evaporated, dried, and calcined for 9 hours under nitrogen atmosphere at 650° C.; after the reaction was completed, the mixture was washed and dried to obtain a cerium oxide coated with chaotic boron nitride-coated cerium oxide tBN@$CeO_2$.
   (6) Tris-HCl buffer solution of a concentration of 10 mM was provided, and the pH of the buffer solution was adjusted to 8.5 with sodium hydroxide to obtain a buffer solution C; the mass ratio of cerium oxide coated with chaotic boron nitride to dopamine was 5:2; boron nitride coated cerium oxide particles and dopamine hydrochloride were added to buffer solution C, stirred at 30° C. for 7 hour; after the reaction was finished, filtered, washed and dried to obtain cerium oxide coated with polydopamine modified chaotic boron nitride PDA@tBN@$CeO_2$.
   (7) 3 g of silicon methoxylated aramid fiber and 9.5 g of polydopamine-modified chaotic boron nitride coated cerium oxide were dispersed in an aqueous solution, and reacted at 55° C. for 7 hours; after the reaction completed, the fiber was taken out, washed, and dried to obtain surface-modified aramid fiber T-KF. The water surface contact angle was 86.6±1.7°.

2. Ultraviolet Irradiation of Clean Fibers and Modified Fibers

The aramid fiber T-KF obtained in the step (7) of Example 4 was subjected to UV irradiation for 168 hours according to the same steps and conditions in Example 1, to obtain 168 h ultraviolet irradiation fiber, recorded as UV-T-KF. The tensile strength decreased by 9.1%.

The invention claimed is:

1. A method for preparing a surface-modified aramid fiber, comprising the following steps:
    (1) immersing a surface-cleaned aramid fiber in an alkali metal hydroxide alcohol solution having a mass concentration of 5.0 to 15.0%, and shaking and reacting at 65° C. for 5 hours to obtain an aramid fiber grafted with amino and carboxyl groups on a surface thereof;
    (2) immersing the aramid fiber grafted with amino and carboxyl groups in an organic solvent containing γ-glycidoxypropyltrimethoxysilane under an inert gas atmosphere, and reacting at 70° C. for 12 hours to obtain a silicon methoxylated aramid fiber;
    (3) dissolving a cerium salt and an inorganic base in water, stirring for 35 minutes, adding hydrogen peroxide to obtain a suspension, adjusting a pH of the suspension to 12, reacting at 40° C. for 12 hours, washing and filtering, drying, calcining at 700° C. for 2 hours to obtain a nano-cerium oxide; dispersing the nano-cerium oxide, a boron source and a nitrogen-containing compound in a mixed solution of ethanol and water, ultrasonically stirring for 1 hour, steaming and drying, calcining at 950° C. for 5 hours under a nitrogen source gas to obtain cerium oxide particles coated with boron nitride;
    (4) adding the cerium oxide particles coated with boron nitride and dopamine hydrochloride to a buffer having a pH of 8.5, and stirring at room temperature for 6 hours; filtering, washing, and drying to obtain a cerium oxide coated with polydopamine modified boron nitride;
    (5) immersing the silicon methoxylated aramid fiber in an aqueous solution of the cerium oxide coated with polydopamine modified boron nitride, and shaking at 60° C. for 6 hours; washing and drying to obtain the surface modified aramid fiber,
    wherein the aramid fiber is a para-aramid fiber or a meta-aramid fiber; the alkali metal hydroxide is sodium hydroxide; the inorganic base is sodium hydroxide; the inert gas is nitrogen gas; the organic solvent is ethanol; the cerium salt is cerium chloride; the boron source is boric acid; the nitrogen-containing compound is urea; the nitrogen source gas is nitrogen; and the buffer is Tris-HCl.

2. The method for preparing the surface-modified aramid fiber according to claim 1, wherein an aramid fiber is sequentially immersed in acetone, petroleum ether and deionized water, each for 2 to 4 hours, and then washed and dried to obtain the surface-cleaned aramid fiber.

3. The method for preparing the surface-modified aramid fiber according to claim 1, wherein a mass ratio of the aramid fiber grafted with amino and carboxyl groups, the γ-glycidyloxypropyltrimethoxysilane, and the organic solvent is 1:(100-200):(150-350); a mass ratio of the nano-cerium oxide, the boron source, the nitrogen-containing compound is 100:(30-50):(60-120); a mass ratio of the silicon methoxylated aramid fiber and the polydopamine-modified boron nitride coated cerium oxide is 1:(2-9); and a mass ratio of the cerium salt and the inorganic base is 100:(20-50).

4. The surface-modified aramid fiber prepared by the method according to claim 1.

* * * * *